(12) United States Patent
Ogawa

(10) Patent No.: US 11,059,142 B2
(45) Date of Patent: Jul. 13, 2021

(54) CONTROLLER, MACHINE LEARNING DEVICE, AND SYSTEM

(71) Applicant: Fanuc Corporation, Yamanashi (JP)

(72) Inventor: Kenichi Ogawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 28 days.

(21) Appl. No.: 16/276,829

(22) Filed: Feb. 15, 2019

(65) Prior Publication Data

US 2019/0275629 A1 Sep. 12, 2019

(30) Foreign Application Priority Data

Feb. 19, 2018 (JP) .............................. JP2018-027089
Dec. 26, 2018 (JP) .............................. JP2018-242793

(51) Int. Cl.
*B23Q 15/12* (2006.01)
*G05B 13/02* (2006.01)
(Continued)

(52) U.S. Cl.
CPC ......... *B23Q 15/12* (2013.01); *G05B 13/0265* (2013.01); *B25J 9/163* (2013.01); *B25J 11/0055* (2013.01)

(58) Field of Classification Search
CPC ............... B23Q 15/12; G05B 13/0265; G05B 2219/49225; G05B 2219/49127; G05B 2219/49037; G05B 2219/49061; G05B 2219/49307; G05B 19/406; B25J 9/163; B25J 11/0055
See application file for complete search history.

(56) References Cited

U.S. PATENT DOCUMENTS

| 5,917,726 A * | 6/1999 | Pryor ............... G05B 19/41875 29/712 |
| 6,415,191 B1 * | 7/2002 | Pryor ............... G05B 19/41875 29/12 |

(Continued)

FOREIGN PATENT DOCUMENTS

| JP | 07219611 A | 8/1995 |
| JP | 9-201742 A | 8/1997 |
| JP | 2017220111 A | 12/2017 |

OTHER PUBLICATIONS

Japanese Decision to Grant a Patent for Japanese Application No. 2018-242793, dated Sep. 8, 2020 with translation, 5 pages.

*Primary Examiner* — Charles R Kasenge
(74) *Attorney, Agent, or Firm* — RatnerPrestia

(57) ABSTRACT

In a controller, a machine learning device, and a system that are capable of addressing change in a clamping force without use of expensive equipment, the controller includes the machine learning device that observes machining condition data indicating machining conditions for cutting, spindle torque data indicating spindle torque during the cutting, and cutting force component direction data indicating cutting force component direction information on cutting resistance against a cutting force, as state variables representing a current state of an environment, and that carries out learning or decision making with use of a learning model modelling the machining conditions for the cutting on which the cutting force that allows holding by a clamping force from a machining jig is exerted on a workpiece based on the state variables.

13 Claims, 10 Drawing Sheets

(51) Int. Cl.
*B25J 9/16* (2006.01)
*B25J 11/00* (2006.01)

(56) References Cited

U.S. PATENT DOCUMENTS

| | | | | |
|---|---|---|---|---|
| 6,438,445 | B1* | 8/2002 | Yoshida | G05B 19/40932 700/173 |
| 6,535,788 | B1* | 3/2003 | Yoshida | G05B 19/40931 700/191 |
| 6,662,073 | B1* | 12/2003 | Fujishima | G05B 19/4069 700/109 |
| 7,805,285 | B2* | 9/2010 | Fukaya | G05B 19/4069 703/2 |
| 7,850,406 | B2* | 12/2010 | Kawai | G05B 19/4015 409/84 |
| 10,514,667 | B2* | 12/2019 | Okuda | G06N 3/08 |
| 10,534,876 | B2* | 1/2020 | Atohira | B25J 9/1671 |
| 2008/0063483 | A1* | 3/2008 | Kawai | G05B 19/4015 409/208 |
| 2010/0178848 | A1* | 7/2010 | Tomita | B23Q 5/58 451/5 |
| 2016/0327939 | A1* | 11/2016 | Yang | G05B 15/02 |
| 2017/0045879 | A1* | 2/2017 | Yang | G05B 19/414 |
| 2017/0138727 | A1* | 5/2017 | Tomita | G05B 19/401 |
| 2017/0357243 | A1 | 12/2017 | Takayama et al. | |
| 2018/0121578 | A1* | 5/2018 | Atohira | G06F 30/20 |
| 2018/0157226 | A1* | 6/2018 | Oku Da | G06N 3/08 |

* cited by examiner

CONTROLLER, MACHINE LEARNING DEVICE, AND SYSTEM

RELATED APPLICATION

The present application claims priority to Japanese Application Number 2018-027089 filed Feb. 19, 2018, and Japanese Application Number 2018-242793 filed Dec. 26, 2018, the disclosure of which is hereby incorporated by reference herein in its entirety.

BACKGROUND OF THE INVENTION

1. Field of the Invention

The present invention relates to a controller, a machine learning device, and a system.

2. Description of the Related Art

In machine tools, machining is carried out for a workpiece fixed onto a machining jig. In methods of fixing such a workpiece, the workpiece is often clamped or unclamped by operation of a cylinder with use of hydraulic pressure or pneumatic pressure as a driving source (for instance, Japanese Patent Application Laid-Open No. 09-201742). Then an insufficient clamping force may allow movement of the workpiece due to cutting resistance and may result in inaccurate machining.

Generally, the clamping force exerted by a machining jig on a workpiece is determined in consideration of cutting resistance against each tool and a safety factor. Then a cylinder larger than necessary may be selected depending on the safety factor that is set, so that such problems as increase in a price of the machining jig or increase in a weight of the machining jig may be caused.

One of factors that necessitate the consideration of the safety factor is change in the clamping force. Generally, pneumatic pressure and hydraulic pressure are used for clamping force to be used in machining jigs.

In use of the pneumatic pressure, it is common to use divided primary air (factory air) and use of a large amount of air in one destination temporarily decreases air pressures in the other sites so as to cause change in the pressures. Usually, attachment of an air tank results in expensive equipment.

In use of the hydraulic pressure, change in a temperature of hydraulic oil causes change in kinetic viscosity, for instance. Increase in the temperature of the hydraulic oil causes decrease in the kinetic viscosity and increase in leakage rates from rotary joints, cylinders, and the like. Thus reduction in the hydraulic pressure occurs. Therefore, a cooling device may be usually attached in order to reduce the increase in the oil temperature and thus may constitute expensive equipment.

SUMMARY OF THE INVENTION

For above reasons, a controller, a machine learning device, and a system that are capable of addressing the change in the clamping force without use of expensive equipment are desired.

An aspect of the invention is a controller that controls a machine tool to perform cutting of a workpiece, clamped on a machining jig, by a tool and that includes a machine learning device to learn machining conditions for the cutting on which a cutting force that allows holding by a clamping force from the machining jig is exerted on the workpiece. The machine learning device includes: a state observation unit that observes machining condition data indicating the machining condition for the cutting, spindle torque data indicating spindle torque during the cutting, and cutting force component direction data indicating cutting force component direction information on cutting resistance against the cutting force, as state variables representing a current state of an environment; a determination data acquisition unit that acquires workpiece quality determination data for determination of quality of the workpiece machined based on the machining conditions for the cutting and cycle time determination data for determination of time taken for machining of the workpiece, as determination data indicating a result of determination on suitability of the machining of the workpiece; and a learning unit that associates and learns the cutting force component direction information on the spindle torque and the cutting resistance during the cutting and the machining conditions for the cutting, with use of the state variables and the determination data.

Another aspect of the invention is a controller that controls a machine tool to perform cutting of a workpiece, clamped on a machining jig, by a tool and that includes a machine learning device to observe machining condition data indicating machining condition for the cutting, spindle torque data indicating spindle torque during the cutting, and cutting force component direction data indicating cutting force component direction information on cutting resistance against a cutting force, as state variables representing a current state of an environment, and to carry out learning or decision making with use of a learning model modelling the machining conditions for the cutting on which the cutting force that allows holding by a clamping force from the machining jig is exerted on the workpiece based on the state variables.

Still another aspect of the invention is a machine learning device that observes machining condition data indicating machining conditions for cutting of a workpiece clamped on a machining jig by a tool, spindle torque data indicating spindle torque during the cutting, and cutting force component direction data indicating cutting force component direction information on cutting resistance against a cutting force, as state variables representing a current state of an environment, and that carries out learning or decision making with use of a learning model modelling the machining conditions for the cutting on which the cutting force that allows holding by a clamping force from the machining jig is exerted on the workpiece based on the state variables.

Yet another aspect of the invention is a system in which a plurality of devices are connected to one another through a network and the plurality of devices include at least the controller described in the first aspect that controls a first machine tool.

According to one aspect of the invention, the machining conditions such as a cutting feed speed and a number of rotation of a spindle may be adjusted in response to change in the clamping force with use of a machine learning technique and without use of expensive equipment, so that accurate machining may be attained.

BRIEF DESCRIPTION OF THE DRAWINGS

The above-mentioned and other objects and features of the invention will become apparent from the following description of the embodiments with reference to the accompanying drawings, in which.

DETAILED DESCRIPTION OF THE PREFERRED EMBODIMENTS

Hereinbelow, embodiments of the invention will be described in conjunction with the drawings.

Figure 1:
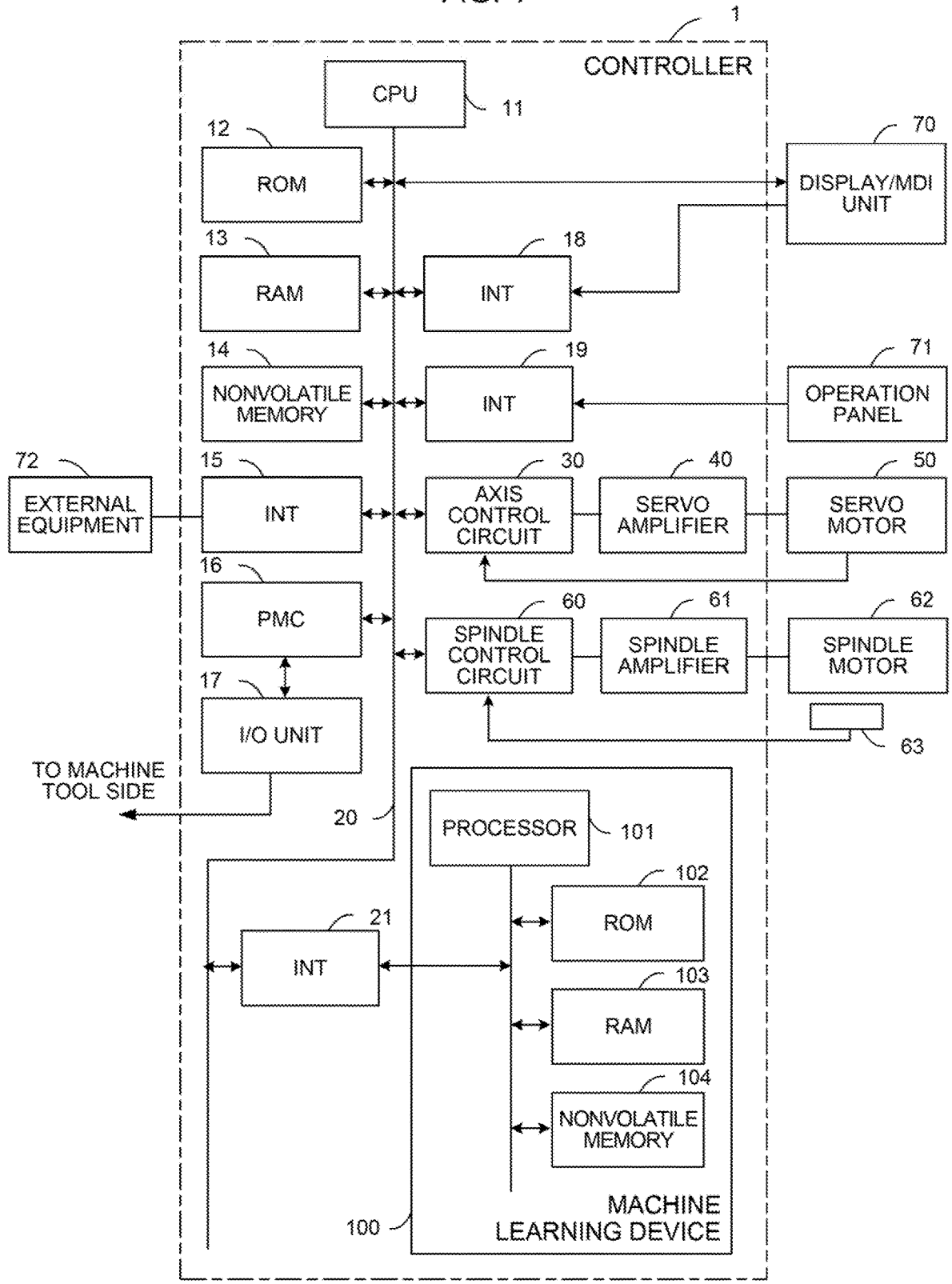
FIG. 1 is a schematic hardware configuration illustrating a controller according to a first embodiment.

FIG. 1 is a schematic hardware configuration illustrating major parts of a controller according to an embodiment. A controller 1 may be implemented as a controller that controls a machine tool, for instance. The controller 1 may be implemented as a personal computer incorporated with a controller that controls a machine tool or a computer such as a cell computer, an edge computer, a fog computer, a host computer, or a cloud server that is connected to a controller through a wired or wireless network, for instance. As the embodiment, an example in which the controller 1 is implemented as a controller that controls a machine tool is disclosed.

A CPU 11 included in the controller 1 according to the embodiment is a processor that generally controls the controller 1. The CPU 11 reads out system programs stored in a ROM 12 via a bus 20 and controls the whole controller 1 in accordance with the system programs. Temporary calculation data and display data, various types of data inputted by an operator through an input unit not illustrated, and the like are temporary stored in a RAM 13.

A nonvolatile memory 14 is configured as a memory which is backed up by a battery not illustrated, for instance, and in which storage status is retained even when the controller 1 is powered off. In the nonvolatile memory 14, programs read through an interface 15 from external equipment 72, programs inputted through a display/MDI unit 70, and various types of data (information on tools such as types of the tools and lives of the tools, information on machining such as cutting conditions, information on workpieces such as workpiece materials, torque values of a spindle, and the like, for instance) acquired from various parts of the controller 1 or robots are stored. The programs and the various types of data that are stored in the nonvolatile memory 14 may be expanded in the RAM 13 for execution/use. Various system programs such as publicly known analysis programs (including system programs for controlling interaction with a machine learning device 100 that will be described later) have been written in advance into the ROM 12.

The interface 15 is an interface for connection between the controller 1 and the external equipment 72 such as an adapter. Programs, various parameters, and the like are read from a side of the external equipment 72. The programs, the various parameters, and the like edited in the controller 1 may be stored in external storage means through the external equipment 72. A programmable machine controller (PMC) 16 outputs signals and thereby exercises control over the machine tool and peripheral devices for the machine tool through an I/O unit 17 in accordance with sequence programs stored in the controller 1. The PMC 16 receives signals from various switches or the like of an operation panel provided on a main unit of the machine tool, carries out necessary signal processing for the signals, and thereafter delivers the signals to the CPU 11.

The display/MDI unit 70 is a manual data input device including a display, a key board, and the like. An interface 18 receives instructions and data from the keyboard of the display/MDI unit 70 and delivers the instructions and the data to the CPU 11. An interface 19 is connected to an operation panel 71 including a manual pulse generator or the like that is used for manually driving each axis.

Axis control circuits 30 for controlling axes of the machine tool receive travel distance instructions for the axes from the CPU 11 and output instructions for the axes to servo amplifiers 40. The servo amplifiers 40 receive the instructions and drive servo motors 50 that move the axes included in the machine tool. The servo motors 50 for the axes house position/speed detectors, feed back position/speed feedback signals from the position/speed detectors to the axis control circuits 30, and exercise feedback control over positions and speeds. Though the axis control circuits 30, the servo amplifiers 40, and the servo motors 50 are respectively illustrated as only one element in the hardware configuration of FIG. 1, a number of the axis control circuits 30, the servo amplifiers 40, and the servo motors 50 that are actually provided is equal to a number of the axes (for instance, three for the machine tool including linear three axes or five for a five-axis processing machine) included in the machine tool to be controlled.

A spindle control circuit 60 receives a spindle rotation instruction for a spindle of the machine tool and outputs a spindle speed signal to a spindle amplifier 61. The spindle amplifier 61 receives the spindle speed signal, rotates a spindle motor 62 for the spindle at a rotation speed based on the instruction, and thereby drives a tool. A position coder 63 is coupled to the spindle motor 62 and outputs return pulses in synchronization with rotation of the spindle. The return pulses are read by the CPU 11.

An interface 21 is intended for making a connection between the controller 1 and the machine learning device 100. The machine learning device 100 includes a processor 101 which controls the whole machine learning device 100, a ROM 102 in which the system programs and the like are stored, a RAM 103 for temporary storage in processing related to machine learning, and a nonvolatile memory 104 which is used for storage of a learning model or the like. The machine learning device 100 may observe information (information on the tools such as the types of the tools and the lives of the tools, information on machining such as the cutting conditions, information on workpieces such as workpiece materials, the torque value of the spindle, and the like, for instance) that may be acquired by the controller 1 through the interface 21. In response to a changing instruction for machining conditions outputted from the machine learning device 100, the controller 1 controls operation of the machine tool.

Figure 2:
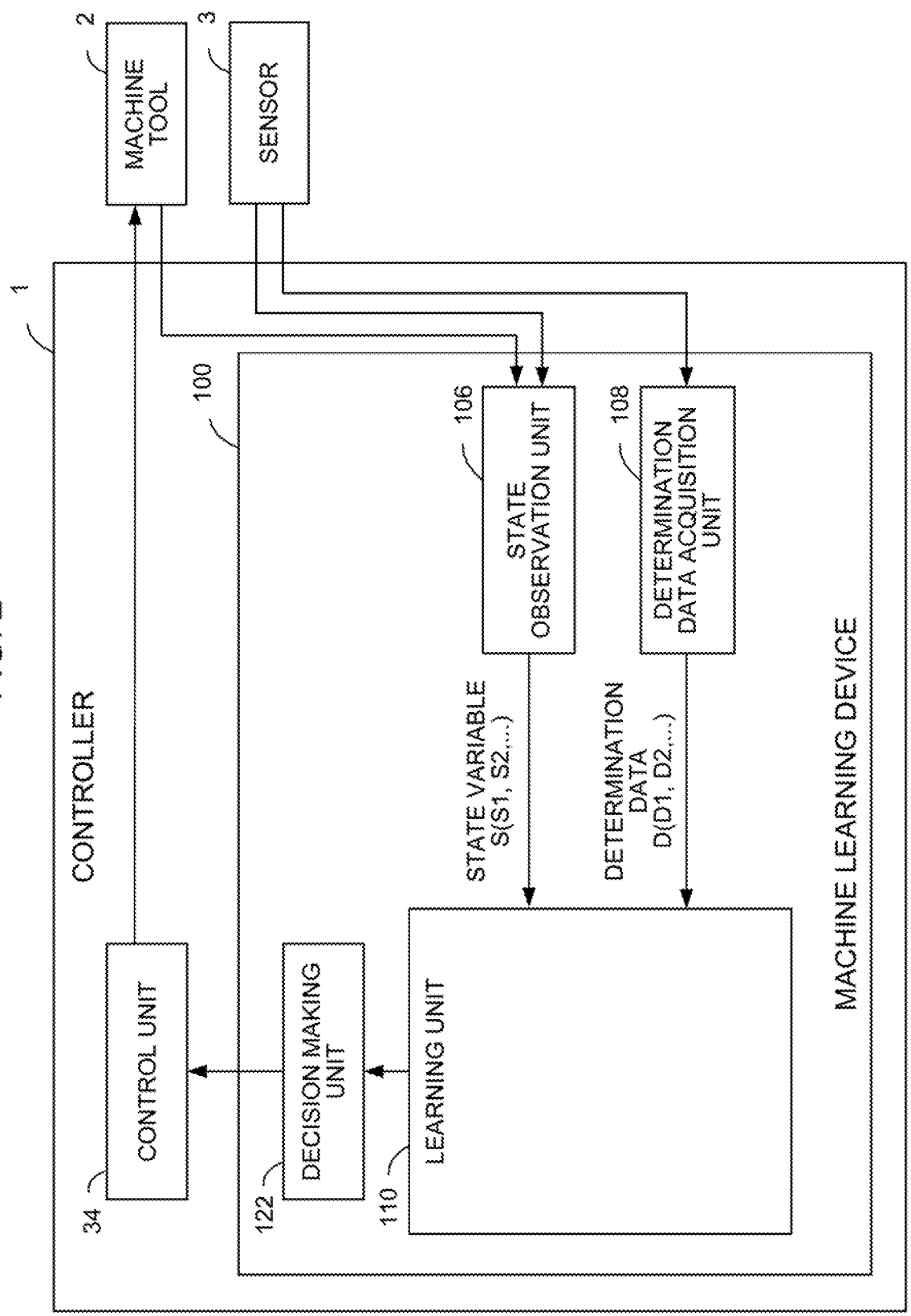
FIG. 2 is a schematic functional block diagram illustrating the controller according to the first embodiment.

FIG. 2 is a schematic functional block diagram illustrating the controller 1 and the machine learning device 100 according to the first embodiment. Functional blocks illustrated in FIG. 2 are implemented by the CPU 11 included in the controller 1 illustrated in FIG. 1 and a processor 101 of the machine learning device 100 that execute respective system programs and that control operations of units in the controller 1 and the machine learning device 100.

The controller 1 of the embodiment includes a control unit 34 that controls a machine tool 2 based on the changing instruction for machining conditions outputted from the machine learning device 100. The control unit 34 generally controls the operation of the machine tool 2 in accordance with instructions based on programs or the like but, upon output of the changing instruction for machining conditions from the machine learning device 100, controls the machine tool 2 so as to fulfil machining conditions outputted from the machine learning device 100 in place of the instructions based on the programs or the like.

Meanwhile, the machine learning device 100 included in the controller 1 includes software (such as learning algorithm) and hardware (such as the processor 101) that are for self-learning through so-called machine learning on the machining conditions for cutting corresponding to cutting force component direction information on spindle torque and cutting resistance during the cutting. What the machine learning device 100 included in the controller 1 learns is equivalent to a model structure that represents a correlation between the cutting force component direction information on the spindle torque and the cutting resistance during the cutting and the machining conditions for the cutting.

As illustrated as the functional blocks in FIG. 2, the machine learning device 100 included in the controller 1 includes a state observation unit 106, a determination data acquisition unit 108, and a learning unit 110. The state observation unit 106 observes state variables S representing a current state of an environment including machining condition data S1 indicating the machining condition for the cutting, spindle torque data S2 indicating the spindle torque during the cutting, and cutting force component direction data S3 indicating the cutting force component direction information on the cutting resistance. The determination data acquisition unit 108 acquires determination data D including workpiece quality determination data D1 for determination of quality of a workpiece machined based on the determined machining conditions for the cutting and cycle time determination data D2 for determination of time taken for machining of the workpiece. The learning unit 110 associates and learns the cutting force component direction information on the spindle torque and the cutting resistance during the cutting and the machining conditions for the cutting with use of the state variables S and the determination data D.

The machining condition data S1 among the state variables S observed by the state observation unit 106 may be acquired as the machining conditions for the cutting. Examples of the machining conditions for the cutting include an actual cutting feed speed, a number of rotation of the spindle, a cutting depth, a rake angle, and the like in the machining by the machine tool 2. The machining conditions for the cutting may be acquired from a program which controls the operation of the machine tool 2, machining parameters set for the controller 1 and stored in the nonvolatile memory 14, or the like.

As the machining condition data S1, the machining conditions for the cutting determined by the machine learning device 100 in a previous learning cycle based on a result of learning by the learning unit 110 for the cutting force component direction information on the spindle torque and the cutting resistance during the cutting in the previous learning cycle may be used without modification. In such a technique, the machine learning device 100 may temporarily store the machining conditions for the cutting for each learning cycle in a RAM 103 and the state observation unit 106 may acquire the machining conditions for the cutting in the previous learning cycle as the machining condition data S1 of a current learning cycle from the RAM 103.

The spindle torque data S2 among the state variables S observed by the state observation unit 106 may be acquired as a load on the spindle motor that drives the spindle of the machine tool 2. The spindle torque data S2 may be acquired from the machine tool 2.

The cutting force component direction data S3 among the state variables S observed by the state observation unit 106 may be acquired as a direction of a cutting force component relative to a direction of the spindle torque during the cutting. The direction of the cutting force component relative to the direction of the spindle torque may be found based on an angle (rake angle) of a cutting edge of the tool relative to the workpiece and may be calculated from a specification (angle of the cutting edge relative to a direction of the spindle) of the tool and an angle (angle of the spindle) of the tool relative to the workpiece being cut.

Figure 3:
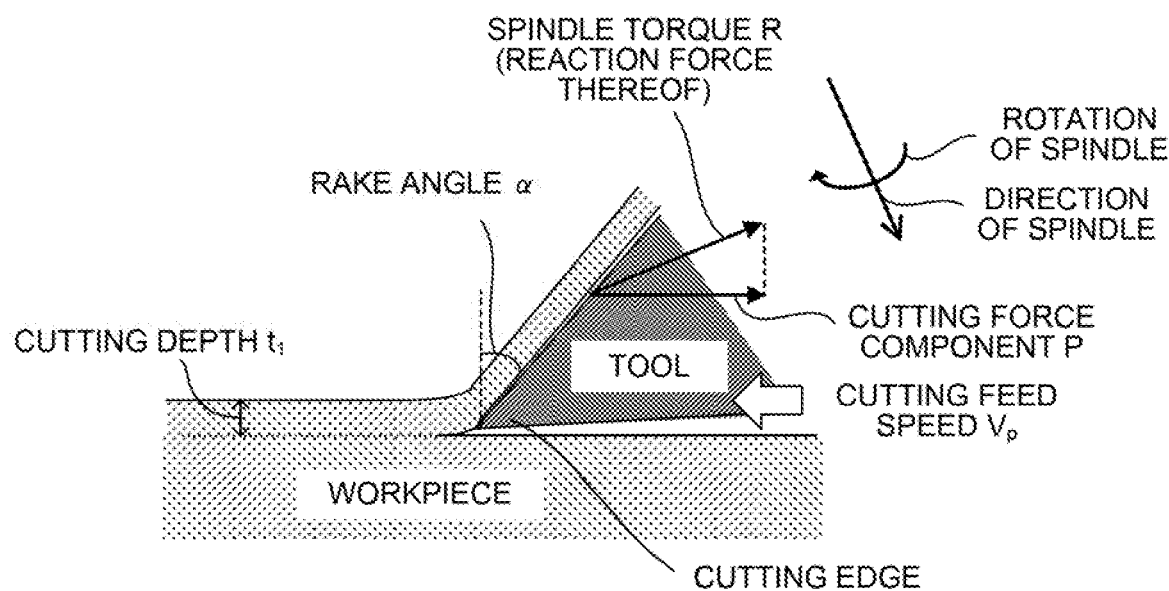
FIG. 3 is a diagram illustrating a relationship among machining condition data S1, spindle torque data S2, and cutting force component direction data S3.

FIG. 3 is a diagram illustrating a relationship among the machining condition data S1, the spindle torque data S2, and the cutting force component direction data S3. Generally, a reaction force from the workpiece against the cutting tool may be calculated with use of a publicly known model such as a two-dimensional cutting model. In an example of FIG. 3, a cutting feed speed $V_p$ at which the cutting edge of the tool travels in a cutting direction is a synthesized speed of an instruction cutting feed speed F based on an instruction from a program or the like and a speed as a component in a cutting feed direction of a travelling speed of the cutting edge provided by rotation of the spindle and may be calculated with use of the instruction cutting feed speed F, the number S of rotation of the spindle, an inclination of the spindle relative to the cutting feed direction, and the like. A cutting force component P that is a reaction force in the cutting feed direction may be calculated with use of spindle torque R, a rake angle α, the inclination of the spindle relative to the cutting feed direction, and the like.

On condition that the learning unit 110 carries out online learning, the state observation unit 106 may sequentially acquire the state variables from units of the machine tool 2, a sensor 3, and the controller 1. On condition that the learning unit 110 carries out off-line learning, it is preferable that the controller 1 should store information acquired during the machining of the workpiece as log data in the nonvolatile memory 14 and that the state observation unit 106 should acquire the state variables by analyzing the recorded log data.

The determination data acquisition unit 108 may use a result of the determination on the quality of the workpiece machined based on the determined machining conditions for the cutting, as the workpiece quality determination data D1. As the workpiece quality determination data D1 to be used by the determination data acquisition unit 108, data as to whether misalignment of a position of the workpiece mounted on a table by a jig is absent (suitable) or present (unsuitable) or the like is preferably used in the online learning or data as to whether dimension errors of parts of the machined workpiece are equal to or smaller than predetermined thresholds (suitable) or exceed the thresholds (unsuitable) or the like is preferably used in the off-line learning, for instance.

The determination data acquisition unit 108 may use a result of the determination on the time taken for the machining of the workpiece based on the determined machining conditions for the cutting, as the cycle time determination data D2. As the cycle time determination data D2 to be used by the determination data acquisition unit 108, a result of the determination based on appropriately set criteria, such as whether the time taken for the machining of the workpiece based on the determined machining conditions for the cutting is shorter (suitable) or longer (unsuitable) than a predetermined threshold, is preferably used, for instance.

The determination data acquisition unit 108 is an essential configuration in a stage of learning by the learning unit 110 but is not necessarily an essential configuration after completion of the learning by the learning unit 110 with association of the cutting force component direction information on the spindle torque and the cutting resistance during the cutting and the machining conditions for the cutting. In case where the machine learning device 100 having completed the learning is shipped to a customer, for instance, shipping with removal of the determination data acquisition unit 108 may be carried out.

In terms of learning cycles of the learning unit 110, the state variables S that are simultaneously inputted into the learning unit 110 are based on data at time one learning cycle before acquisition of the determination data D. While the machine learning device 100 included in the controller 1 advances the learning, acquisition of the spindle torque data S2 and the cutting force component direction data S3, the machining of the workpiece by the machine tool 2 based on the machining condition data S1 determined based on the acquired data, and the acquisition of the determination data D are thus iteratively carried out in the environment.

The learning unit 110 learns the machining conditions for the cutting corresponding to the cutting force component direction information on the spindle torque and the cutting resistance during the cutting in accordance with arbitrary learning algorithm that is generically referred to as machine learning. The learning unit 110 is capable of iteratively executing the learning based on a data set including the state variables S and the determination data D described above. During iteration of the learning cycle for the machining conditions for the cutting corresponding to the cutting force component direction information on the spindle torque and the cutting resistance during the cutting, the state variables S are acquired from the cutting force component direction information on the spindle torque and the cutting resistance during the cutting in the previous learning cycle and the machining conditions for the cutting determined in the previous learning cycle, as described above, and the determination data D is based on results of the determination on the suitability of the machining of the workpiece based on the determined machining conditions for the cutting.

When carrying out the online learning, the learning unit 110 sequentially iterates the learning with use of the state variables S acquired during the machining and the workpiece quality determination data D1 such as data on the misalignment of the mounting position of the workpiece acquired by a distance sensor or the like, for instance. When carrying out the off-line learning, preferably, the learning unit 110 may produce a series of the state variables S for each specified cycle along flow of the machining by analyzing the log data recorded during the machining, may identify a site where a steep change has occurred in the spindle torque data S2 in the state variables, may assign the workpiece quality determination data D1 such as the dimension errors of the parts of the machined workpiece that have been determined as unsuitable data to the state variable S at the site (assigns suitable data to the other state variables S), may distribute and assign results of the determination on the cycle time determination data D2 to all the state variables S, for instance, and may carry out the learning with use of the series of the state variables S and the determination data D produced as above.

Iteration of such a learning cycle makes it possible for the learning unit 110 to identify a characteristic that implies the correlation between the cutting force component direction information on the spindle torque and the cutting resistance during the cutting and the machining conditions for the cutting. Though the correlation between the cutting force component direction information on the spindle torque and the cutting resistance during the cutting and the machining conditions for the cutting is substantially unknown when the learning algorithm is started, the learning unit 110 interprets the correlation by gradually identifying the characteristic as the learning advances. When the correlation between the cutting force component direction information on the spindle torque and the cutting resistance during the cutting and the machining conditions for the cutting is interpreted to a level that is reliable to a certain degree, results of the learning that are iteratively outputted by the learning unit 110 are made usable for action selection (that is, decision making) as to how the machining conditions for the cutting are to be determined on a current state (that is, the cutting force component direction information on the spindle torque and the cutting resistance during the cutting). That is, the learning unit 110 is capable of attaining gradual approach to an optimal solution of correlation with action as to how to set the machining conditions for the cutting in relation to the cutting force component direction information on the spindle torque and the cutting resistance during the cutting, with advance in the learning algorithm.

A decision making unit 122 determines the machining conditions for the cutting based on the result of the learning by the learning unit 110 and outputs the determined machining conditions for the cutting to the control unit 34. When the cutting force component direction information on the spindle torque and the cutting resistance during the cutting is inputted into the machine learning device 100 in a stage in which the learning by the learning unit 110 is made usable, the decision making unit 122 outputs the machining conditions for the cutting (such as the cutting feed speed, the number of rotation of the spindle, the cutting depth, and the rake angle). The machining conditions for the cutting outputted from the decision making unit 122 are machining conditions on which a cutting force that allows holding of the workpiece within a range of clamping force from the jig is exerted on the workpiece. The decision making unit 122 determines the appropriate machining conditions for the cutting based on the state variables S and the results of the learning by the learning unit 110.

In the machine learning device 100 included in the controller 1, as described above, the learning unit 110 learns the machining conditions for the cutting corresponding to the cutting force component direction information on the spindle torque and the cutting resistance during the cutting in accordance with the machine learning algorithm with use of the state variables S observed by the state observation unit 106 and the determination data D acquired by the determination data acquisition unit 108. The state variables S are composed of data such as the machining condition data S1, the spindle torque data S2, and the cutting force component direction data S3 and the determination data D is unambiguously found by analysis of information resulting from measurement of the workpiece and information acquired by the controller 1 from the machine tool 2. According to the machine learning device 100 included in the controller 1, therefore, use of the results of the learning by the learning unit 110 makes it possible to automatically and accurately set the machining conditions for the cutting in accordance with the cutting force component direction information on the spindle torque and the cutting resistance during the cutting.

Provided that the machining conditions for the cutting can be automatically determined, appropriate values of the machining conditions for the cutting can be promptly determined only by grasp of the cutting force component direction information (cutting force component direction data S3) on the spindle torque (spindle torque data S2) and the cutting resistance during the cutting. Therefore, the machining conditions for the cutting can be efficiently determined.

As a modification of the machine learning device 100 included in the controller 1, the state observation unit 106 may observe hydraulic oil state data S4 indicating a temperature of hydraulic oil in addition to the machining condition data S1, the spindle torque data S2, and the cutting force component direction data S3, as the state variables S. On condition that hydraulic pressure is used for the clamping force from the jig, change in the temperature of the hydraulic oil may be a cause of reduction in the hydraulic pressure and accuracy of the learning by the learning unit 110 can be increased by observation of the temperature as the state variable S.

As another modification of the machine learning device 100 included in the controller 1, the state observation unit 106 may observe tool state data S5 indicating a state of a tool in addition to the machining condition data S1, the spindle torque data S2, and the cutting force component direction data S3, as the state variables S. The cutting force exerted on the workpiece differs depending on the type of the tool, the life of the tool (dullness of cutting edge), or the like even under the same cutting conditions and thus the accuracy of the learning by the learning unit 110 can be increased by observation of the type of the tool, the life of the tool, or the like as the state variable S.

As still another modification of the machine learning device 100 included in the controller 1, the state observation unit 106 may observe workpiece material data S6 indicating material of the workpiece in addition to the machining condition data S1, the spindle torque data S2, and the cutting force component direction data S3, as the state variables S. The cutting force exerted on the workpiece (reaction force from the workpiece) differs depending on the material of the workpiece even under the same cutting conditions and thus the accuracy of the learning by the learning unit 110 can be increased by observation of the material of the workpiece as the state variable S.

Figure 4:
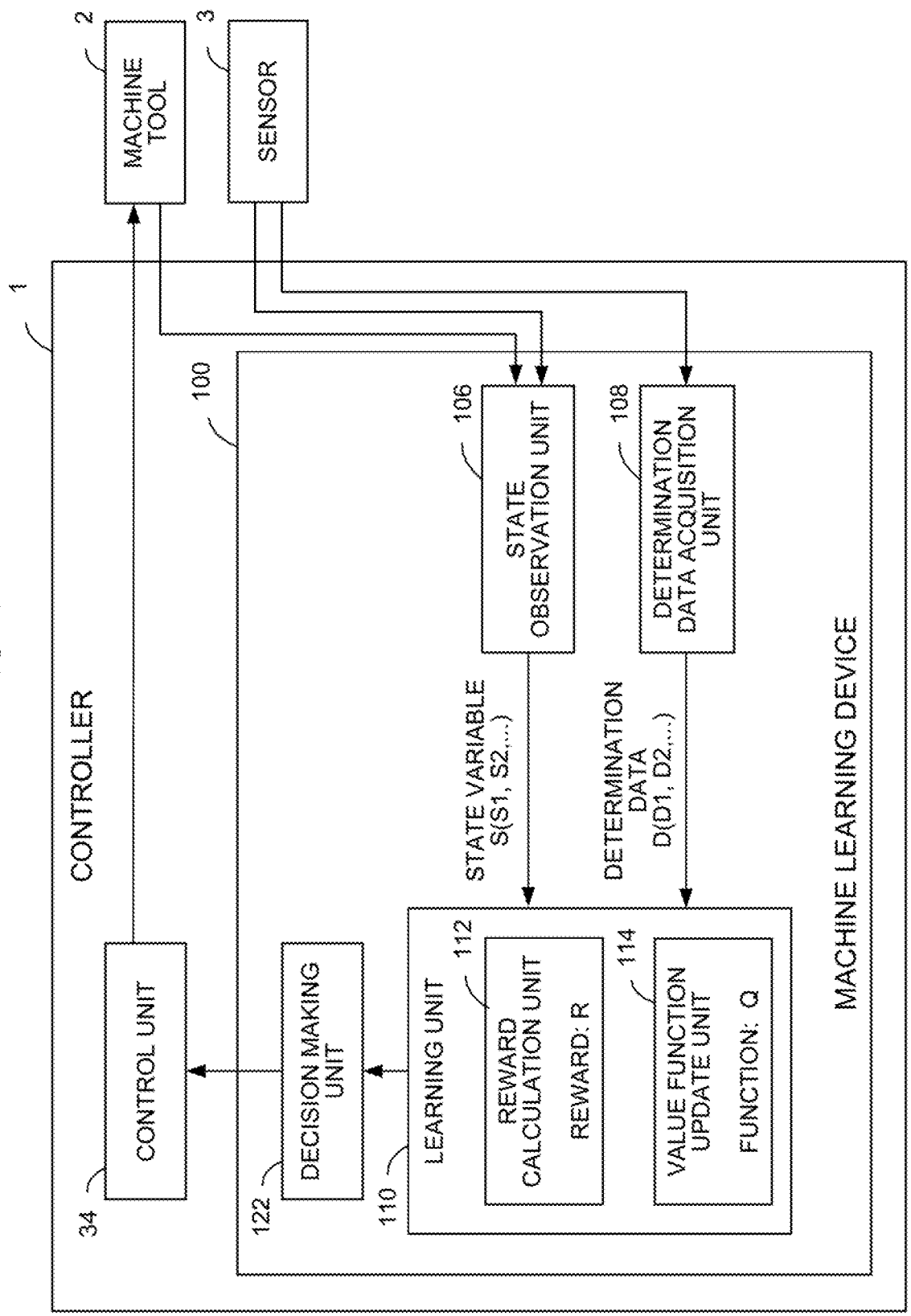
FIG. 4 is a schematic functional block diagram illustrating a mode of the controller.

In the machine learning device 100 having the above configuration, there is no particular limitation on the learning algorithm that is executed by the learning unit 110 and a learning algorithm that is publicly known for machine learning may be employed. FIG. 4 illustrates a mode of the controller 1 illustrated in FIG. 2 and a configuration including the learning unit 110 that carries out reinforcement learning as an example of the learning algorithm. The reinforcement learning is a technique in which a cycle including observing a current state (that is, input) of an environment where a learning object exists, executing specified action (that is, output) in the current state, and conferring a reward of some sort for the action is iterated in a trial-and-error manner and in which a measure (the machining conditions for the cutting in the machine learning device of the application) that maximizes a total of such rewards is learned as an optimal solution.

In the machine learning device 100 included in the controller 1 illustrated in FIG. 4, the learning unit 110 includes a reward calculation unit 112 and a value function update unit 114. The reward calculation unit 112 finds a reward R related to the result (corresponding to the determination data D to be used in a learning cycle subsequent to the acquisition of the state variables S) of the determination on the suitability of the machining of the workpiece by the machine tool 2 based on the machining conditions for the cutting determined based on the state variables S. The value function update unit 114 updates a function Q representing a value of the machining conditions for the cutting with use of the reward R. The learning unit 110 learns the machining conditions for the cutting corresponding to the cutting force component direction information on the spindle torque and the cutting resistance during the cutting, through iteration of update of the function Q by the value function update unit 114.

An example of algorithm for the reinforcement learning that is executed by the learning unit 110 will be described. The algorithm of the example, which is known as Q-learning, is a technique of using a state s of an actor and an action a the actor may select in the state s, as independent variables, and of learning a function Q(s, a) representing a value of the action in a case where the action a is selected in the state s. The optimal solution is to select the action a that maximizes the value function Q in the state s. The Q-learning is started in a state in which correlation between the state s and the action a is unknown and the value function Q is iteratively updated so as to be made to approach the optimal solution by iteration of trials and errors of selection of various actions a in an arbitrary state s. The value function Q may be made to approach the optimal solution in comparatively short time by a configuration in which a reward r (that is, weighting of an action a) is obtained corresponding to a change in the environment (that is, the state s) as a result of the selection of the action a in the state s and by leading of the learning to selection of the action a leading to higher reward r.

An update expression for the value function Q may be generally expressed as Expression 1 below. In Expression 1, $s_t$ and $a_t$ respectively represent the state and the action at time t and the state is changed into $s_{t+1}$ by the action $a_t$. $r_{t+1}$ represents the reward obtained as a result of change of the state from $s_t$ to $s_{t+1}$. A term of maxQ means Q at time when the action a that brings about (that is thought to bring about at time t) the greatest value Q at time t+1 is taken. α and γ respectively represent a learning coefficient and a discount rate and are arbitrarily set within ranges of 0<α≤1 and 0<γ≤1.

$$Q(s_t, a_t) \leftarrow Q(s_t, a_t) + \alpha \left( r_{t+1} + \gamma \max_a Q(s_{t+1}, a) - Q(s_t, a_t) \right)$$
[Expression 1]

On condition that the learning unit 110 carries out the Q-learning, the state variables S observed by the state observation unit 106 and the determination data D acquired by the determination data acquisition unit 108 correspond to the state s in the update expression, the action as to how to determine the machining conditions for the cutting corresponding to the current state (that is, the cutting force component direction information on the spindle torque and the cutting resistance during the cutting) corresponds to the action a in the update expression, and the reward R found by the reward calculation unit 112 corresponds to the reward r in the update expression. Therefore, the value function update unit 114 iteratively updates the function Q representing the value of the machining conditions for the cutting corresponding to the current state, through the Q-learning using the reward R.

The reward R found by the reward calculation unit 112 may be positive (plus), in case where the result of the determination on the suitability of the machining of the workpiece based on the determined machining conditions for the cutting after the determination of the machining conditions for the cutting is "suitable" (for instance, in case where the workpiece has been machined without misalignment or in case where the cycle time for the machining of the workpiece is shorter than the predetermined threshold or the cycle time in the previous learning cycle) or may be negative (minus), in case where the result of the determination on the suitability of the machining of the workpiece based on the determined machining conditions for the cutting after the determination of the machining conditions for the cutting is "unsuitable" (for instance, in case where the misalignment of the workpiece has occurred or in case where the cycle time for the machining of the workpiece is longer than the predetermined threshold or the cycle time in the previous learning cycle), for instance. Absolute values of the positive reward R and the negative reward R may be the same or may be different. As for conditions for the determination, the determination may be made with use of a combination of a plurality of values included in the determination data D.

The results of the determination on the suitability of the machining of the workpiece based on the set machining conditions for the cutting may be set not only in two ways of "suitable" and "unsuitable" but in a plurality of stages. In case where the threshold of the cycle time for the machining of the workpiece is $T_{max}$, as an example, a configuration may be used in which the reward R=5 for the cycle time T of an assembly operation by an operator satisfying $0 \leq T < T_{max}/5$, the reward R=3 for $T_{max}/5 \leq T < T_{max}/2$, the reward R=1 for $T_{max}/2 \leq T < T_{max}$, or the reward R=−3 (minus reward) for $T_{max} \leq T$ is conferred.

Furthermore, a configuration may be used in which the threshold to be used for the determination is set so as to be comparatively large in an early stage of the learning and in which the threshold to be used for the determination is decreased with advance in the learning.

The value function update unit 114 may have an action value table in which the state variables S, the determination data D, and the rewards R are organized in association with action values (such as numerical values) represented by the function Q. In this configuration, behavior by the value function update unit 114 of updating the function Q is equivalent to behavior by the value function update unit 114 of updating the action value table. At beginning of the Q-learning, correlation between the current state of the environment and the machining conditions for the cutting is unknown. In the action value table, therefore, the various state variables S, the determination data D, and the rewards R have been prepared in association with the action values (function Q) determined randomly. Upon obtainment of the determination data D, the reward calculation unit 112 is capable of immediately calculating the corresponding reward R and the calculated value R is written into the action value table.

With advancement of the Q-learning with use of the rewards R corresponding to the results of the determination on the suitability of the operation of the machine tool 2, the learning is led so that the action leading to higher reward R may be selected. Then rewriting of the action values (function Q) on the actions to be taken in the current state and update of the action value table are carried out in accordance with the state of the environment (that is, the state variables S and the determination data D) that changes as a result of execution of the selected action in the current state. Through the iteration of the update, the action values (function Q) indicated in the action value table are rewritten so as to be greater for more appropriate actions (in the present invention, actions of determining the machining conditions for the cutting on which the cutting force that allows the holding of the workpiece within the range of the clamping force from the jig is exerted on the workpiece, such as decrease in the cutting feed speed, decrease in the number of rotation of the spindle, decrease in the cutting depth, and increase in the rake angle to such an extent that the cycle time for the machining of the workpiece may not be extremely prolonged). Thus the correlation between the current state of the environment (the cutting force component direction information on the spindle torque and the cutting resistance during the cutting) and the corresponding action (the machining conditions for the cutting) that has been unknown is gradually clarified. That is, the relationship between the cutting force component direction information on the spindle torque and the cutting resistance during the cutting and the machining conditions for the cutting is gradually made to approach the optimal solution by the update of the action value table.

Figure 5:
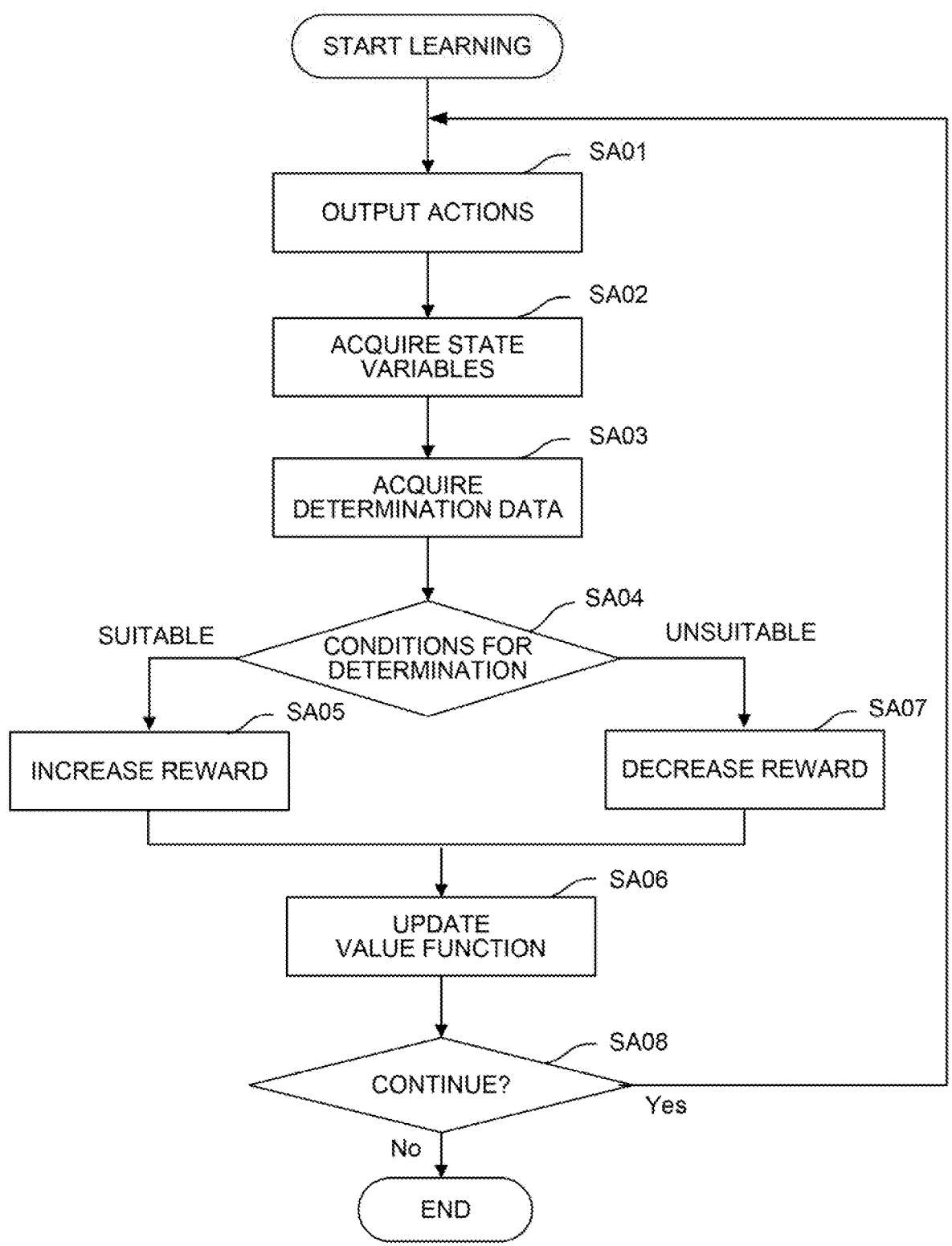
FIG. 5 is a schematic flowchart illustrating a mode of a machine learning method.

With reference to FIG. 5, flow of the above-mentioned Q-learning (that is, a mode of machine learning method) that is executed by the learning unit 110 will be further described. In step SA01, initially, the value function update unit 114 randomly selects the machining conditions for the cutting as the actions to be taken in the current state indicated by the state variable S observed by the state observation unit 106 while referring to the action value table at the current time. Subsequently, the value function update unit 114 takes in the state variable S in the current state observed by the state observation unit 106, in step SA02, and takes in the determination data D in the current state acquired by the determination data acquisition unit 108, in step SA03. Subsequently, the value function update unit 114 determines whether the machining conditions for the cutting have been appropriate or not based on the determination data D, in step SA04. In case where the machining conditions for the cutting have been appropriate, the value function update unit 114 applies the positive reward R found by the reward calculation unit 112 to the update expression for the function Q, in step SA05, and subsequently updates the action value table with use of the state variables S and the determination data D in the current state, the reward R, and the action value (updated function Q), in step SA06. In case where it is determined in step SA04 that the machining conditions for the cutting have not been appropriate, the negative reward R found by the reward calculation unit 112 is applied to the update expression for the function Q, in step SA07, and the action value table is subsequently updated with use of the state variables S and the determination data D in the current state, the reward R, and the action value (updated function Q), in step SA06. By iterating steps SA01 to SA07, the learning unit 110 iteratively updates the action value table and advances the learning of the machining conditions for the cutting. A process of finding the reward R and a process of updating the value function from step SA04 to step SA07 are executed for each datum included in the determination data D.

Figure 6A:
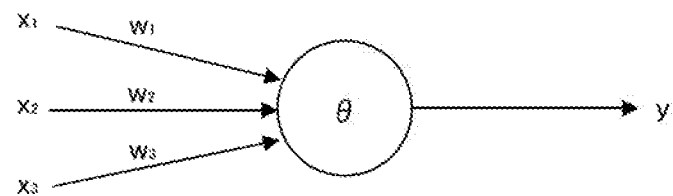
FIG. 6A is a diagram illustrating neurons.
Figure 6B:
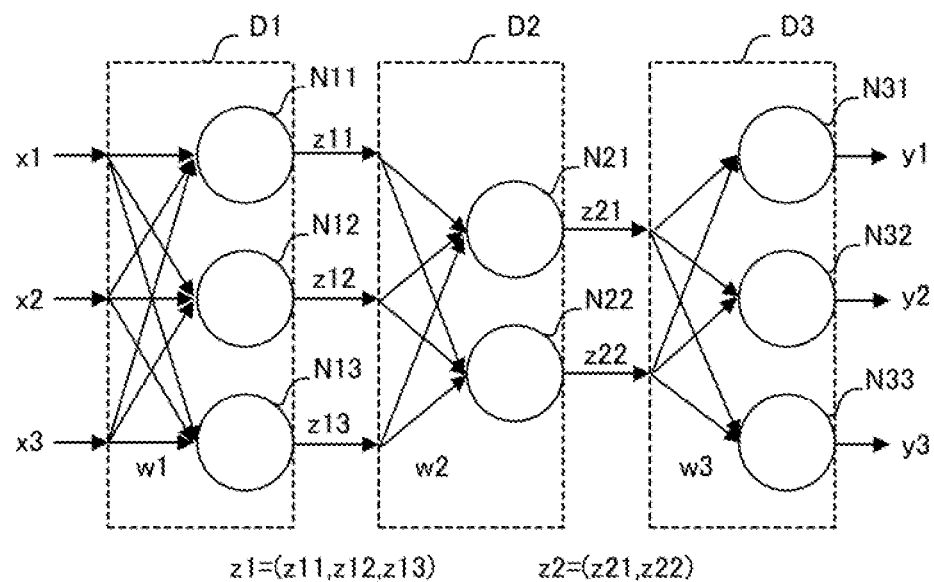
FIG. 6B is a diagram illustrating a neural network.

For advancement of the reinforcement learning described above, a neural network may be applied, for instance. FIG. 6A schematically illustrates a model of neurons. FIG. 6B schematically illustrates a model of a three-layer neural network configured by combination of the neurons illustrated in FIG. 6A. The neural network may be configured with use of arithmetic units, storage devices, and the like that are modeled after a neuron model, for instance.

The neurons illustrated in FIG. 6A output a result y of a plurality of inputs x (inputs $x_1$ to $x_3$, as an example). The inputs $x_1$ to $x_3$ are multiplied by weights w ($w_1$ to $w_3$) corresponding to the inputs x. Thus the neurons output the output y expressed by Expression 2 below. In Expression 2, all of the inputs x, the output y, and the weights w are vectors. θ is a bias and $f_k$ is an activating function.

$$y = f_k\left(\sum_{i=1}^{n} x_i w_i - \theta\right) \quad \text{[Expression 2]}$$

In the three-layer neural network illustrated in FIG. 6B, a plurality of inputs x (inputs x1 to x3, as an example) are inputted from a left side and results y (results y1 to y3, as an example) are outputted from a right side. In an example illustrated in the drawing, the inputs x1, x2, and x3 are each multiplied by corresponding weights (generically represented as w1) and the inputs x1, x2, and x3 are each inputted into three neurons N11, N12, and N13.

In FIG. 6B, outputs from the neurons N11 to N13 are generically represented as z1. z1 can be regarded as feature vectors in which feature amounts of the input vectors are extracted. In the example illustrated in the drawing, the feature vectors z1 are each multiplied by corresponding weights (generically represented as w2) and are each inputted into two neurons N21 and N22. The feature vectors z1 represent features between the weights w1 and the weights w2.

In FIG. 6B, outputs from the neurons N21 and N22 are generically represented as z2. z2 can be regarded as feature vectors in which feature amounts of the feature vectors z1 are extracted. In the example illustrated in the drawing, the feature vectors z2 are each multiplied by corresponding weights (generically represented as w3) and are each inputted into three neurons N31, N32, and N33. The feature vectors z2 represent features between the weights w2 and the weights w3. Lastly, the neurons N31 to N33 respectively output results y1 to y3.

A so-called deep learning technique with use of a neural network that forms three or more layers may be used.

In the machine learning device 100 included in the controller 1, the neural network may be used as the value function in the Q-learning and the value (result y) of the relevant action in the relevant state may be outputted through calculation in a multi-layer structure by the learning unit 110 pursuant to the above-mentioned neural network with use of the state variables S and the action a as the input x. Operation modes of the neural network include a learning mode and a value prediction mode. The weights w can be learned with use of learning data sets in the learning mode and a value judgment on action can be made with use of the learned weights w in the value prediction mode, for instance. In the value prediction mode, detection, classification, inference, and the like can also be carried out.

The above-described configuration of the controller 1 can be described as a machine learning method (or software) that is executed by the processor 101. The machine learning method is a machine learning method for learning the machining conditions for the cutting and includes causing a CPU of a computer to observe the machining condition data S1, the spindle torque data S2, and the cutting force component direction data S3 as the state variables S representing the current state of the environment in which the machine tool 2 operates, to acquire the determination data D indicating the result of the determination on the suitability of the machining of the workpiece based on the determined machining conditions for the cutting, and to associate and learn the spindle torque data S2, the cutting force component direction data S3, and the machining conditions for the cutting with use of the state variables S and the determination data D.

Figure 7:
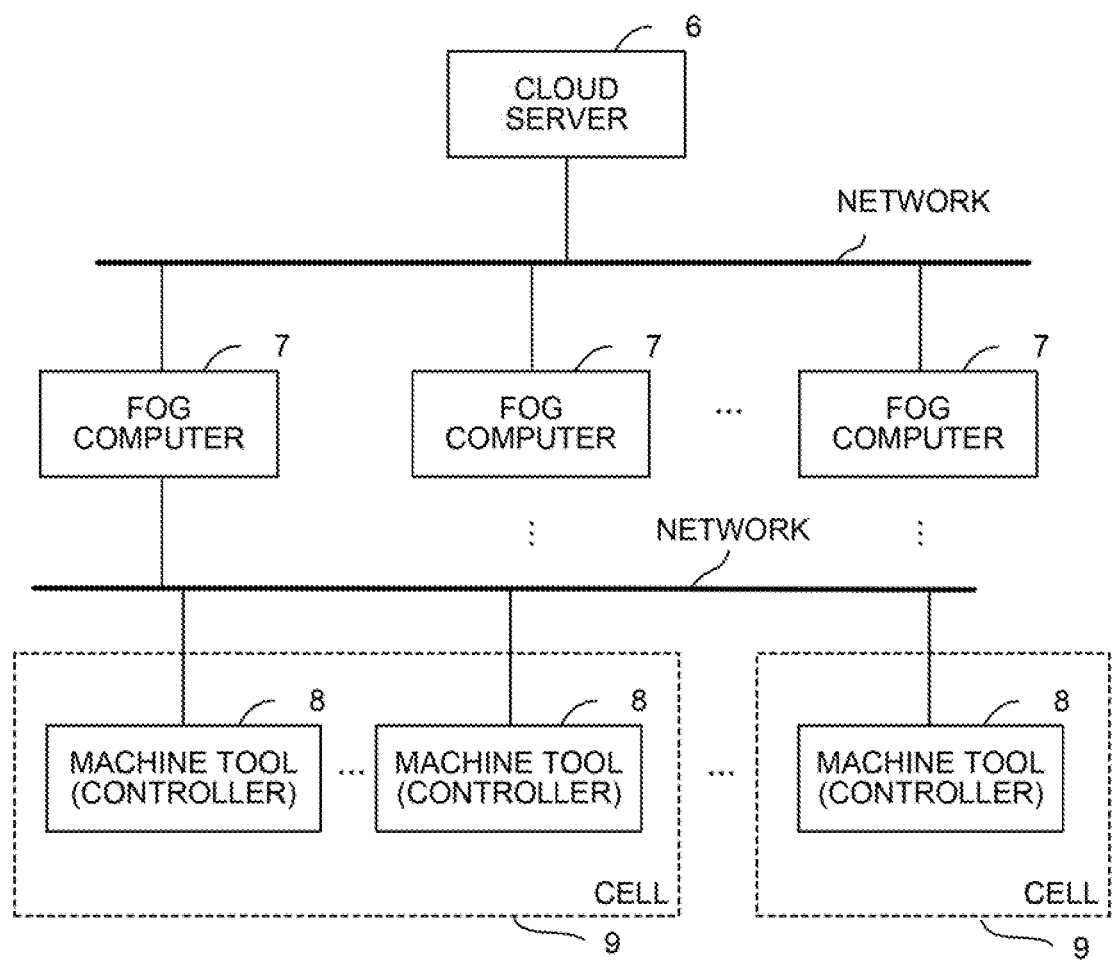
FIG. 7 is a diagram illustrating an example of a system with a three-layer structure including a cloud server, fog servers, and edge computers.

As second to fourth embodiments below, embodiments in which the controller 1 according to the first embodiment is connected to a plurality of devices including a cloud server, a host computer, fog computers, and edge computers (robot controllers, controllers, or the like) through a wired or wireless network will be described. As the second to fourth embodiments below, as illustrated as an example in FIG. 7, systems that are each configured so as to be logically separated into three levels are assumed. The three levels are made of a layer including a cloud server 6 or the like, a layer including fog computers (fog servers) 7 or the like, and a layer including edge computers 8 (robot controllers, controllers, or the like included in cells 9) with the plurality of devices each connected to the network. In such a system, the controller 1 may be implemented on any of the cloud server 6, the fog computers 7, and the edge computers 8 and is capable of distributed learning with sharing of learning data with the plurality of devices through the network, large-scale analysis with collection of generated learning models into the fog computers 7 or the cloud server 6, and mutual reuse of the generated learning models, or the like. In the system illustrated as the example in FIG. 7, a plurality of cells 9 are provided in each factory in various regions and a fog computer 7 in a higher layer manages each cell 9 in a specified unit (unit of a factory, unit of a plurality of factories of the same manufacturer, or the like). Data collected and analyzed by the fog computers 7 may be collected and analyzed by the cloud server 6 in a still higher layer and resultant information may be utilized for control over each of the edge computers, or the like.

Figure 8:
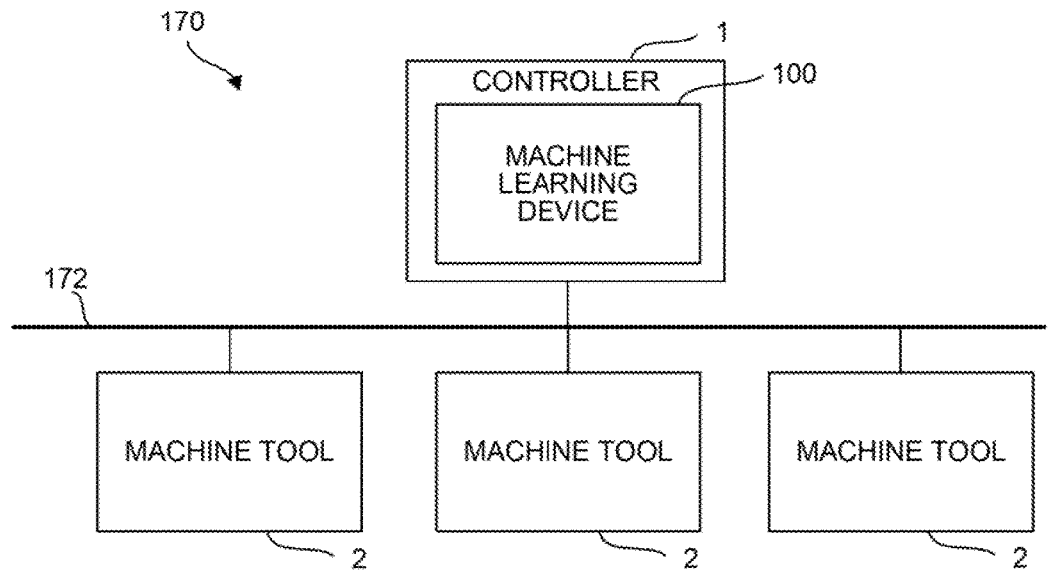
FIG. 8 is a schematic functional block diagram illustrating a mode of a system in which a controller is integrated.

FIG. 8 illustrates a system 170 according to the second embodiment that includes the controller 1. The system 170 includes at least one controller 1 implemented as a portion of a computer such as an edge computer, a fog computer, a host computer, or a cloud server, a plurality of machine tools 2 to be controlled, and a wired or wireless network 172 that connects the controller 1 and the machine tools 2 to one another.

In the system 170 having an above configuration, the controller 1 including the machine learning device 100 is capable of automatically and accurately finding the machining conditions for the cutting corresponding to the cutting force component direction information on the spindle torque and the cutting resistance during the cutting, for each of the machine tools 2, with use of results of the learning by the learning unit 110. Besides, a configuration may be provided in which the machine learning device 100 of the controller 1 learns the machining conditions for the cutting that are common to all the machine tools 2, based on the state variables S and the determination data D that are acquired for each of the plurality of machine tools 2 and makes results of such learning common to operations of all the machine tools 2. According to the system 170, consequently, a speed and reliability of the learning of the machining conditions for the cutting can be improved with more diverse data sets (including the state variables S and the determination data D) used as input.

Figure 9:
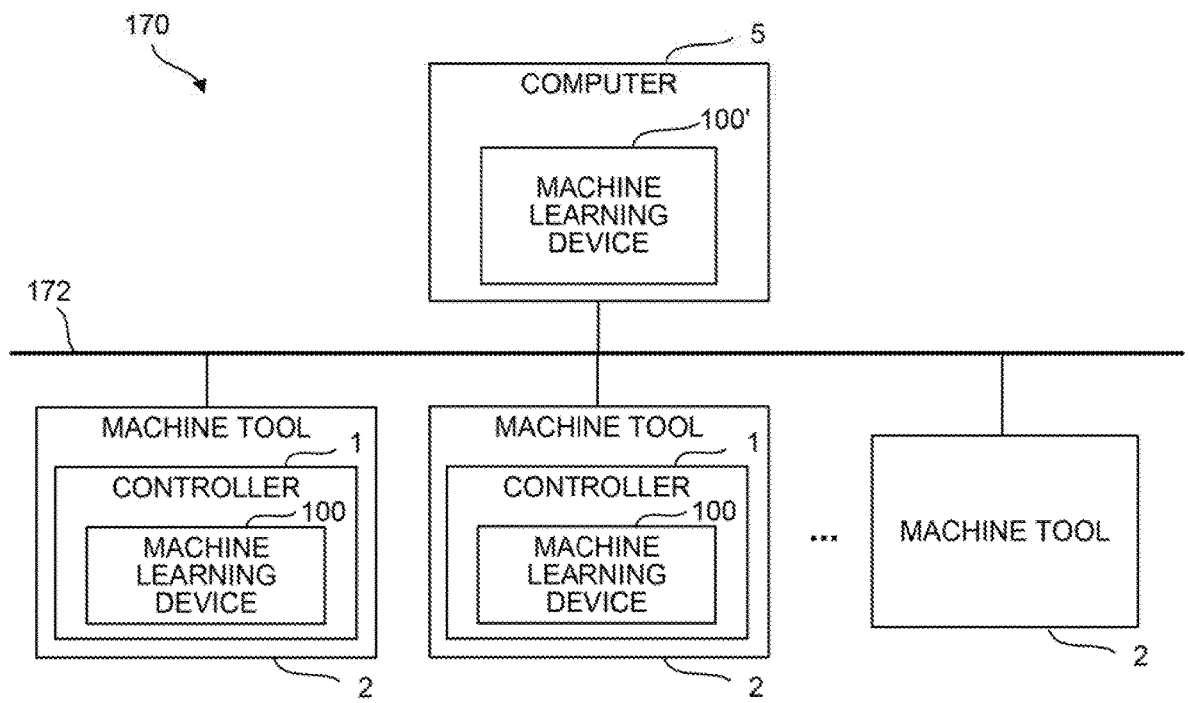
FIG. 9 is a schematic functional block diagram illustrating another mode of a system in which controllers are integrated.

FIG. 9 illustrates a system 170 according to the third embodiment that includes the controller 1. The system 170 includes at least one machine learning device 100' implemented on a computer 5 such as an edge computer, a fog computer, a host computer, or a cloud server, at least one controller 1 implemented as a controller (edge computer) that controls machine tools 2, and a wired or wireless network 172 that connects the computer 5 and the machine tools 2 to one another.

In the system 170 having an above configuration, the computer 5 including the machine learning device 100' acquires learning models obtained as results of machine learning by the machine learning device 100 included in the controller 1 that controls each machine tool 2, from the controller 1. The machine learning device 100' included in the computer 5 newly generates an optimized or streamlined learning model through a process of optimizing or streamlining knowledge based on the plurality of learning models and distributes the generated learning model to the controller 1 that controls each machine tool 2.

As an example of the optimization or streamlining of the learning model by the machine learning device 100', generation of a distilled model based on the plurality of learning models acquired from each controller 1 may be taken. In this example, the machine learning device 100' according to the embodiment newly generates the learning model (distilled model) by producing input data to be inputted into the learning models and by carrying out learning from scratch with use of output resulting from input of such input data into each learning model (such a learning process is referred to as distillation). In the distillation, the original learning models are referred to as teacher models and the newly generated distilled model is referred to as student model. The distilled model generated in such a manner is generally smaller in size than the original learning models but is capable of attaining accuracy equivalent to accuracy of the original learning models. Therefore, the distilled model is more suitable for distribution to other computers through external storage media, a network, or the like.

As another example of the optimization or streamlining of the learning model by the machine learning device 100', it is conceivable, in a process of the distillation of the plurality of learning models acquired from each controller 1, to analyze a distribution of output of the learning models in response to the input data by a general statistical technique, to extract outliers in a set of the input data and the output data, and to carry out the distillation with use of the set of the input data and the output data from which the outliers have been excluded. Through such a process, exceptional estimation results may be excluded from the set of the input data and the output data that is acquired from each learning model and thus the distilled model may be generated with use of the set of the input data and the output data from which the exceptional estimation results have been excluded. As the distilled model generated in such a manner, a universal distilled model for the machine tools 2 that are controlled by the plurality of controllers 1 may be generated from the learning models generated by the plurality of controllers 1.

Another general technique of optimizing or streamlining the learning model (analysis of each learning model and optimization of hyperparameters of the learning models based on results of the analysis, or the like) may be appropriately introduced.

In operation of the system according to the embodiment, for instance, the machine learning device 100' may be provided on a fog computer provided for a plurality of machine tools 2 (controllers 1) as edges and the learning models generated by each machine tool 2 (controller 1) may be intensively stored on the fog computer, subjected to the optimization or streamlining based on the plurality of stored learning models, and then saved in a storage device. Then, the optimized or streamlined learning models that have been saved may be redistributed to the machine tools 2 (controllers 1) as appropriate.

In the system according to the embodiment, for instance, the learning models intensively stored on the fog computer, the learning models optimized or streamlined on the fog computer, or the like may be gathered onto a host computer or a cloud server on a still higher level and may be used for application to intellectual work in factories or manufacturers of the machine tools 2 (such as construction and redistribution of a more universal learning model in a higher-level server, support for maintenance work based on the results of the analysis of the learning models, analysis of performance or the like of each machine tool 2, or application to development of a new machine).

Figure 10:
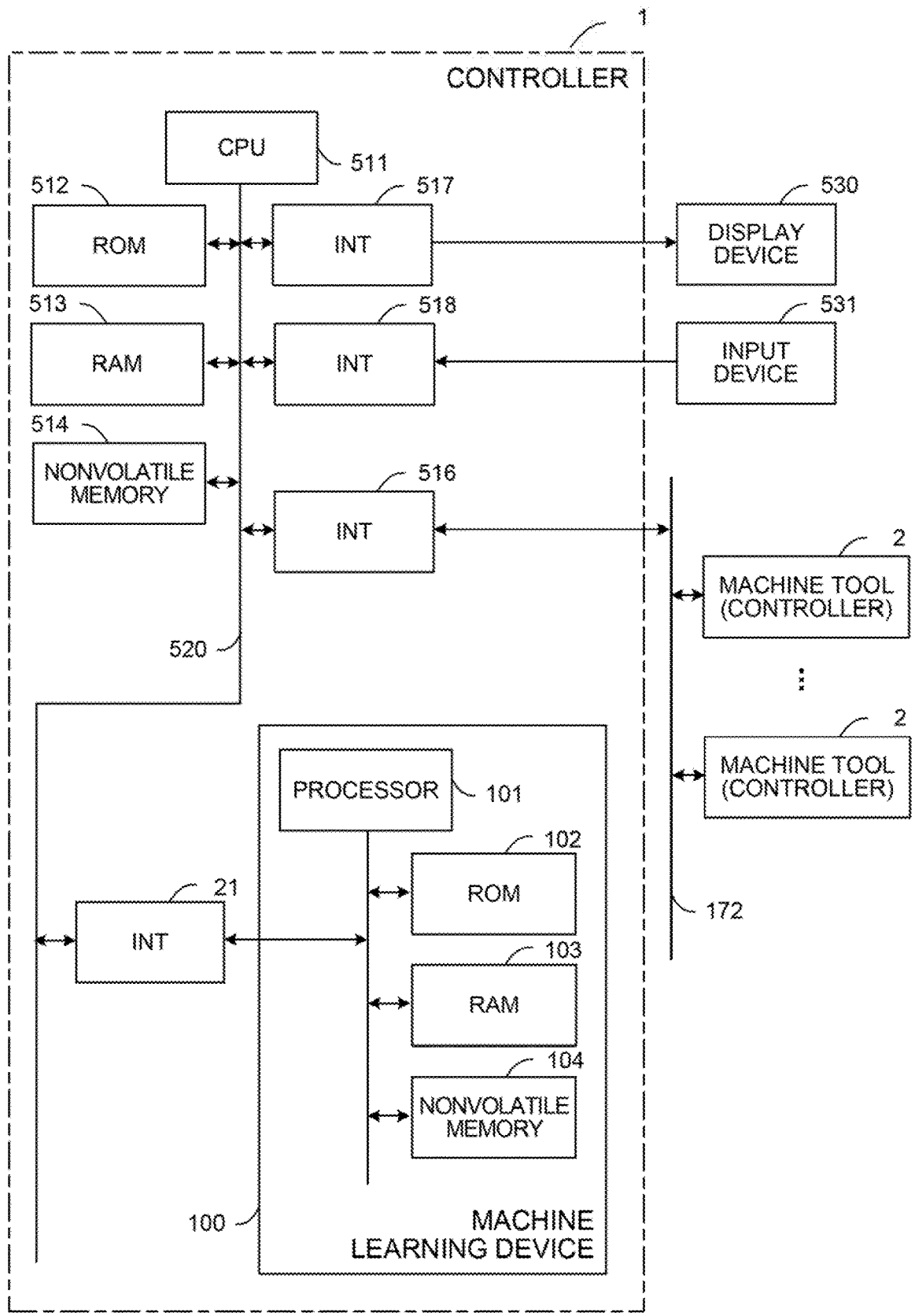
FIG. 10 is a schematic hardware configuration illustrating a computer illustrated in FIG. 9.

FIG. 10 is a schematic hardware configuration illustrating the computer 5 illustrated in FIG. 9.

A CPU 511 included in the computer 5 is a processor that generally controls the computer 5. The CPU 511 reads out system programs stored in a ROM 512 through a bus 520 and controls the whole computer 5 in accordance with the system programs. Temporary calculation data, various types of data inputted by an operator through an input device 531, and the like are temporarily stored in a RAM 513.

A nonvolatile memory 514 is configured as a memory which is backed up by a battery not illustrated, a solid state drive (SSD), or the like, for instance, and storage status in the nonvolatile memory 514 is retained even when the computer 5 is powered off. The nonvolatile memory 514 has a setting area where configuration information on operation of the computer 5 is stored. The data inputted from the input device 531, the learning models acquired from (the controllers for) the machine tools 2, data read through an external storage device or a network not illustrated, and the like are stored in the nonvolatile memory 514. The programs and the various types of data that are stored in the nonvolatile memory 514 may be expanded in the RAM 513 for execution/use. System programs including publicly known analysis programs for analysis of various types of data or the like have been written in advance into the ROM 512.

The computer 5 is connected to the network 172 through an interface 516. At least one machine tool 2, other computers, and the like are connected to the network 172 so as to carry out data interaction with the computer 5.

On a display device 530, data obtained as results of execution of data, programs, or the like read onto a memory, or the like is outputted through an interface 517 and displayed. The input device 531 made of a keyboard, a pointing device, or the like delivers instructions, data, or the like, based on operation by an operator, to the CPU 511 through an interface 518.

The machine learning device 100 is the same as the machine learning device 100 described with reference to FIG. 1, except for use for the optimization or streamlining of the learning models in cooperation with the CPU 511 of the computer 5.

Figure 11:
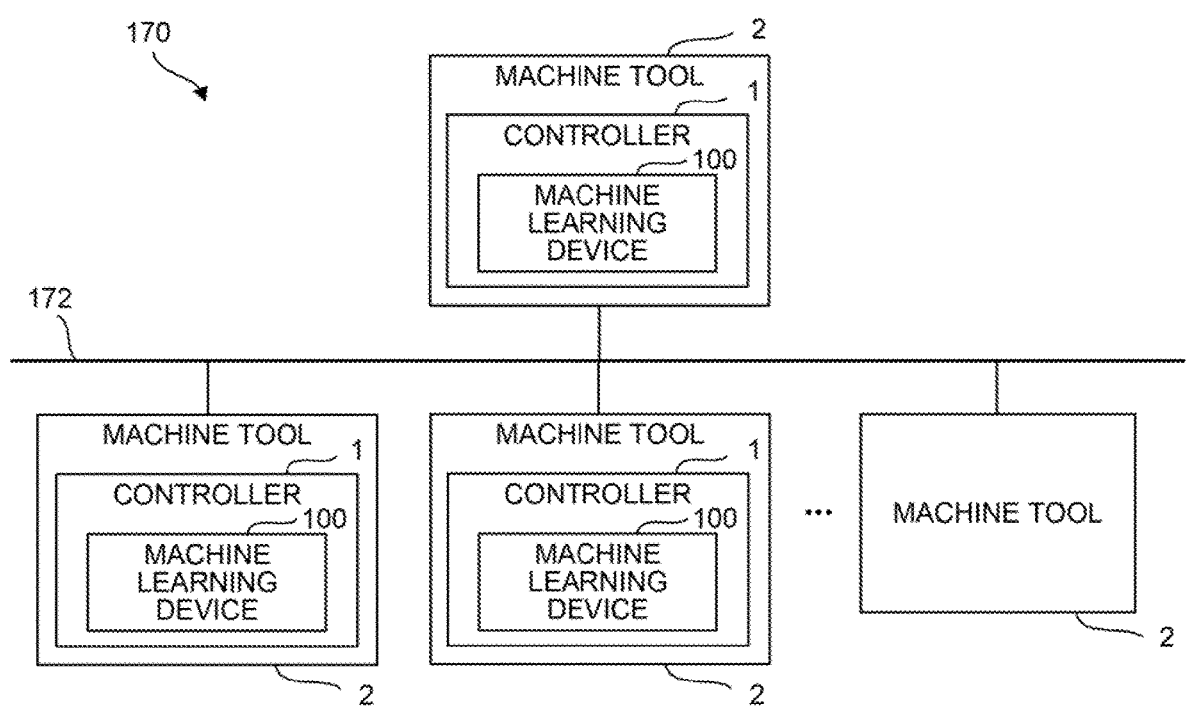
FIG. 11 is a schematic functional block diagram illustrating still another mode of a system in which controllers are integrated.

FIG. 11 illustrates a system 170 according to the fourth embodiment that includes the controller 1. The system 170 includes a plurality of controllers 1 implemented as controllers (edge computers) that control machine tools 2 and a wired or wireless network 172 that connects the plurality of machine tools 2 (controllers 1) to one another.

In the system 170 having an above configuration, each of the controllers 1 including the machine learning devices 100 carries out machine learning based on state data or determination data acquired from the machine tool 2 to be controlled and state data or determination data acquired from other machine tools 2 (not including the machine learning device 100) and generates a learning model. The learning model generated in such a manner is not only used for determination of appropriate machining conditions for cutting in machining operation of the object machine tool 2 but also used for determination of appropriate machining conditions for cutting in machining operation by (the controller of) a machine tool 2 not including the machine learning device 100 in response to a request from the machine tool 2. When a controller 1 including the machine learning device 100 that has not generated a learning model is newly introduced, a learning model may be acquired from another controller 1 through the network 172 and may be used.

In the system according to the embodiment, the data and the learning models to be used for learning may be shared among and utilized by the plurality of machine tools 2 (controllers 1) as so-called edges, so that increase in efficiency of the machine learning and reduction in costs for the machine learning (such as introduction of the machine learning device 100 only into one controller that controls a machine tool 2 and sharing of the machine learning device 100 with other machine tools 2) may be attained.

Though the embodiments of the invention have been described above, the invention is not limited only to examples of the embodiments described above and can be embodied in various manners with appropriate modifications.

For instance, the learning algorithms and the arithmetic algorithms that are executed by the machine learning device 100, control algorithms that are executed by the controller 1, and the like are not limited to the above and various algorithms may be employed.

Though the controller 1 and the machine learning device 100 have been described as devices having different CPUs for the embodiments, the machine learning device 100 may be implemented with use of the CPU 11 included in the controller 1 and the system programs stored in the ROM 12.

Though the embodiments of the invention have been described above, the invention is not limited to the examples of the embodiments described above and can be embodied in other manners with appropriate modifications.

The invention claimed is:

1. A controller that controls a machine tool to perform cutting of a workpiece, clamped on a machining jig, by a tool, the controller comprising:
a machine learning device that observes machining condition data indicating machining conditions for the cutting, spindle torque data indicating spindle torque during the cutting, and cutting force component direction data indicating cutting force component direction information on cutting resistance against a cutting force, as state variables representing a current state of an environment, and that carries out learning or decision making with use of a learning model modelling the machining conditions for the cutting on which the cutting force that allows holding by a clamping force from the machining jig is exerted on the workpiece based on the state variables.

2. The controller according to claim 1, wherein the machine learning device includes
a state observation unit that observes the machining condition data indicating the machining condition for the cutting, the spindle torque data indicating the spindle torque during the cutting, and the cutting force component direction data indicating the cutting force component direction information on the cutting resistance against the cutting force, as the state variables representing the current state of the environment,
a determination data acquisition unit that acquires workpiece quality determination data for determination of quality of the workpiece machined based on the machining conditions for the cutting and cycle time determination data for determination of time taken for machining of the workpiece, as determination data indicating a result of determination on suitability of the machining of the workpiece, and
a learning unit that generates the learning model for which the cutting force component direction information on the spindle torque and the cutting resistance during the cutting and the machining conditions for the cutting have been associated to be learned with use of the state variables and the determination data.

3. The controller according to claim 2, wherein the learning unit includes
a reward calculation unit that finds a reward related to the result of the determination on the suitability, and
a value function update unit that uses the reward to update a function representing a value of the machining conditions for the cutting corresponding to the cutting force component direction information on the spindle torque and the cutting resistance during the cutting, and
the reward calculation unit confers the higher reward, as the quality of the workpiece becomes higher and the time taken for the machining of the workpiece becomes shorter.

4. The controller according to claim 2, wherein the learning unit carries out calculation of the state variables and the determination data in a multi-layer structure.

5. The controller according to claim 1, wherein the machine learning device includes
a state observation unit that observes the machining condition data indicating the machining condition for the cutting, the spindle torque data indicating the spindle torque during the cutting, and the cutting force component direction data indicating the cutting force component direction information on the cutting resistance against the cutting force, as the state variables representing the current state of the environment,
a learning unit that includes the learning model for which the cutting force component direction information on the spindle torque and the cutting resistance during the cutting and the machining conditions for the cutting have been associated to be learned, and a decision making unit that determines the machining conditions for the cutting based on the state variables observed by the state observation unit and the learning model.

6. The controller according to claim 1, wherein the machine learning device exists in a cloud server.

7. A system wherein a plurality of devices are connected to one another through a network and the plurality of devices include at least the controller according to claim 1 that controls a first machine tool.

8. The system according to claim 7, wherein the plurality of devices include a computer including a machine learning device, the computer acquires at least one learning model generated through learning in the learning unit of the controller, and the machine learning device carries out optimization or streamlining based on the acquired learning model.

9. The system according to claim 7, wherein the plurality of devices include a second machine tool that is different from the first machine tool, and a result of learning by the learning unit included in the controller that controls the first machine tool is shared with the second machine tool.

10. The system according to claim 7, wherein the plurality of devices include a second machine tool that is different from the first machine tool, and data observed in the second machine tool is usable for learning by the learning unit included in the controller that controls the first machine tool through the network.

11. A machine learning device that observes machining condition data indicating machining conditions for cutting of a workpiece clamped on a machining jig by a tool, spindle torque data indicating spindle torque during the cutting, and cutting force component direction data indicating cutting force component direction information on cutting resistance against a cutting force, as state variables representing a current state of an environment, and that carries out learning or decision making with use of a learning model modelling the machining conditions for the cutting on which the cutting force that allows holding by a clamping force from the machining jig is exerted on the workpiece based on the state variables.

12. The machine learning device according to claim 11, comprising:

a state observation unit that observes the machining condition data indicating the machining conditions for the cutting, the spindle torque data indicating the spindle torque during the cutting, and the cutting force component direction data indicating the cutting force component direction information on the cutting resistance against the cutting force, as the state variables representing the current state of the environment;

a determination data acquisition unit that acquires workpiece quality determination data for determination of quality of the workpiece machined based on the machining conditions for the cutting and cycle time determination data for determination of time taken for machining of the workpiece, as determination data indicating a result of determination on suitability of the machining of the workpiece; and a learning unit that generates the learning model for which the cutting force component direction information on the spindle torque and the cutting resistance during the cutting and the machining conditions for the cutting have been associated to be learned with use of the state variables and the determination data.

13. The machine learning device according to claim 11, comprising:

a state observation unit that observes the machining condition data indicating the machining conditions for the cutting, the spindle torque data indicating the spindle torque during the cutting, and the cutting force component direction data indicating the cutting force component direction information on the cutting resistance against the cutting force, as the state variables representing the current state of the environment;

a learning unit that includes the learning model for which the cutting force component direction information on the spindle torque and the cutting resistance during the cutting and the machining conditions for the cutting have been associated to be learned; and a decision making unit that determines the machining conditions for the cutting based on the state variables observed by the state observation unit and the learning model.

* * * * *